Patented Sept. 5, 1939

2,171,869

UNITED STATES PATENT OFFICE 2,171,869

PREPARATION OF ORGANIC CYANO COMPOUNDS

Norman D. Scott, Sanborn, and Joseph Frederic Walker, Niagara Falls, N. Y., assignors to E. I. du Pont de Nemours & Company, Wilmington, Del., a corporation of Delaware No Drawing. Application April 9, 1936, Serial No. 73,600

11 Claims. (Cl. 260—464)

This invention relates to the preparation of organic cyano compounds.

An object of the present invention is to provide a method for converting nitriles into other organic cyano compounds, e. g., the conversion of a nitrile to another nitrile of higher molecular weight or the conversion of a nitrile to a cyano acid. A further object is the preparation of alkali metal compounds of nitriles. Other objects will be hereinafter apparent.

The above objects are attained in accordance with the hereindescribed invention by first preparing an alkali metal addition compound of a polycyclic aromatic hydrocarbon, and reacting this addition compound with a nitrile, whereby an alkali metal compound of the nitrile is formed. The alkali metal compound of the nitrile then may be reacted with various reagents such as carbon dioxide, alkyl halides and the like, to prepare valuable products.

In this method the alkali metal addition compounds of the polycyclic aromatic hydrocarbons serve as carriers for the alkali metal for the formation of the alkali metal compounds of the nitrile. The alkali metal cyano compounds thus formed generally are in a highly reactive state, which facilitates further synthetic reactions.

The alkali metal derivatives used as alkali metal carriers in accordance with the present invention are obtained by the addition of alkali metals to aromatic polycyclic hydrocarbons such as naphthalene, diphenyl, anthracene, acenaphthene, retene and the like, including their homologs. The method of producing these reactive and soluble sodium derivatives was first described by Scott in U. S. Patent 2,027,000 and a continuation of this patent, U. S. Patent 2,019,832. Certain classes of ether solvents were found to have a very specific action in promoting the reaction of alkali metals with aromatic hydrocarbons to form these intermediate addition products which according to the present invention must be used in the dissolved state in the ether solvents in which they have been prepared. Ethers which have been found useful in preparing these alkali metal addition products include all mono ethers and poly ethers containing a CH₃—O— group and in which the ratio of the number of oxygen atoms to the number of carbon atoms is not less than 1:4 and whose structures are stable in contact with the alkali metal and its aromatic hydrocarbon addition complex in question.

By "stable" ethers we do not mean that the ethers may not react in some reversible reaction with the alkali metal and/or aromatic hydrocarbon since indications are that the ethers in effecting the reactions may to some extent take part in the reaction, but the ether must not be broken up or form irreversible reaction products. Thus, for example, ethylene oxide may be considered a cyclic ether falling within the limitations given for the oxygen carbon ratio; however, it reacts, for instance, with sodium naphthalene and hence cannot satisfactorily perform the function required. There may be a very slow ether cleavage with some of the good solvents, but at a rate much slower than that of the desired reaction. In order to simplify the wording later, we further specify such ethers as are "effective" within my invention as being "stable" although as noted they may play some reactive role in causing the reactions to proceed.

Inert non-ether types of solvents, such as hydrocarbons or alkyl sulfides which do not react with the alkali metals and which in themselves are non-effective for the reactions, may be used as diluting agents for the effective ethers. There is, however, a minimum concentration for the effective ether in the non-effective solvents beyond which the reaction will not proceed. Thus, in general, the effective ether can be diluted with a non-reactive, non-effective hydrocarbon or ether up to four or five times its volume. If the dilution be as high as six to ten times the volume of the effective ether, the reaction to form the alkali metal addition product will not proceed.

By the use of these effective ethers alkali metals have been shown to add to aromatic hydrocarbons and certain hydroaromatic hydrocarbons containing more than one benzene nucleus as well as to certain nitrogen containing compounds such as n-methyl carbazol. Aromatic hydrocarbon compounds possessing a reactive methylene group are, of course, excluded from the list of hydrocarbons which will yield these addition compounds. For further description, the invention will be illustrated particularly with respect to the reaction of naphthalene with sodium, but it is to be understood that what is said thereon will apply equally well to the reaction of other alkali metals and to any of the suitable naphthalene homologues and analogues and other condensed ring systems which will allow these intermediates to form.

Effective ethers which fall within the specifications set forth above include dimethyl ether, methyl ethyl ether, ethylene glycol dimethyl ether, ethylene glycol methyl ethyl ether, ethylene glycol methyl butyl ether, ethylene glycol diethyl ether, ethylene glycol formal, glycerol formal methyl ether, the simple tri ethers of glycerol, tertiary amines and many others with similar properties which will function as solvents for the alkali metal intermediates and also mixtures of these ethers with non-effective solvents up to the concentration at which the effective ether ceases to exert its activating effect.

It is highly important that these effective ethers be essentially free from more than traces of hydroxyl or other impurities, which react with sodium to give especially those which yield insoluble compounds and which tend to "coat over" the surface of the metal, in order to get the addition reaction to start. The sodium should itself be clean and have been preserved under some inert solvent prior to use. The form of the sodium is immaterial, but cubes of the metal one fourth inch on an edge have been found quite satisfactory. Generally, even with the best of care in preparing the solvents, naphthalene and sodium, it is necessary to scratch the surfaces of these sodium cubes to initiate the formation of the green colored (in the case of naphthalene) sodium addition complex. A mechanical stirrer with sufficient speed to cause the sodium cubes to rub over each other lightly under the surface of a solution of naphthalene in one of the effective ethers will in a short time remove this thin protective film from the metallic surfaces and allow the reaction to proceed with great rapidity.

The effective ether solution of naphthalene will readily dissolve sodium in an amount equivalent to one gram atom of sodium for each gram molecule of naphthalene; thereafter the solution of further amounts of sodium becomes so slow as to be negligible. This is somewhat unexpected since the reaction products obtained by further treatment of the green sodium naphthalene complex, for example, with water or carbon dioxide, indicate that it is in large part the 1,4 disodium naphthalene:

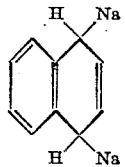

It is probable that this is an equilibrium reaction. It is also found that other isomeric disodium addition compounds are formed as evidenced by the formation of isomeric acids upon treatment with carbon dioxide.

In view of the fact that the solution which is thus prepared, and contains one gram atom of sodium for each gram molecule of naphthalene, is a highly colored green solution and readily conducts the electric current, it is possible that the addition compound may exist in solution as a free radical which may be represented by the formula:

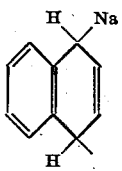

The soluble compound may involve the combination of disodium naphthalene with an extra molecule of naphthalene in some other manner. Its formula could be written, $Na_2C_{10}H_8$—$C_{10}H_8$, without specifying the exact method of combination. Moreover, this soluble addition product may conceivably also include some combination with the ether solvent to account for the specific action of the effective ethers. The reactions of these alkali addition products, however, are clearly evident and their use as intermediates is in no way limited by any hypothesis as to the probable structure in solution.

If such a solution which contains sodium equivalent to one gram atom of sodium for each gram molecule of naphthalene be treated with water or alcohol, it will yield equivalent amounts of naphthalene and dihydronaphthalene; with $CO_2$, it will yield the sodium salts of dihydronaphthalene dicarboxylic acids along with an equivalent amount of naphthalene. If, however, either the hydrolysis or the carboxylation is carried out gradually while further amounts of sodium are present in the liquid, further amounts of this sodium will dissolve as that in solution is used by the hydrolysis or carboxylation. In this manner, it is possible to react essentially all of the naphthalene and recover the major amount as dihydronaphthalene or dihydronaphthalene dicarboxylic acids.

The present invention is not restricted to the use of the above described ethers as solvents for the reaction between the polycyclic aromatic hydrocarbons and alkali metals. For example, certain amino compounds are also effective as solvents for promoting these alkali metal addition reactions. These amino compounds, which are described in co-pending joint applications filed by N. D. Scott and J. F. Walker include the amines: trimethylamine, dimethyl ethylamine, and tetramethyl ethylene diamine and a variety of amino ethers having tertiary amino groups, such as dimethylamino dimethyl ether, dimethylaminoethyl methyl ether, diethylaminoethyl methyl ether, dimethylaminoethyl diether of ethylene glycol and diethylamino dioxan.

We will now proceed to describe the use of this sodium addition product of naphthalene to form alkali metal compounds of nitriles. We have discovered that when nitriles are added to the green solution of sodium naphthalene in one of the effective solvents, in general a metathesis reaction occurs in which the sodium atom is transferred to the position occupied by the acidic hydrogen with the formation of dihydronaphthalene as a byproduct. The reaction between sodium naphthalene and acetonitrile is typical:

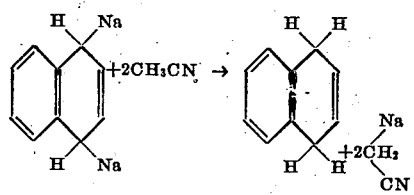

The alkali metal compounds thus prepared may be reacted with various reagents reactive with alkali metal organic compounds to prepare other organic derivatives. Such reactions conveniently may be carried out by adding the desired reagent to the reaction mixture in which the alkali metal compound of the nitrile has been formed, thus avoiding the step of first isolating the metal compound. Thus, they may be reacted with alkyl halides to form other nitriles of higher molecular weight. By treatment with carbon dioxide, these alkali metal compounds of nitriles may be converted into salts of cyano acids, for example the sodium compound of acetonitrile thus may be converted into the sodium salt of cyanoacetic acid, as shown by the following equation:

$$CH_2NaCN + CO_2 \rightarrow CH_2(CN)COONa$$

Our invention is further illustrated by the following examples:

Example 1

Acetonitrile, 20.5 grams, was added to a solution of sodium naphthalene (equivalent to 14 grams sodium) in 250 cc. of dimethyl ether at −50° C. As soon as the acetonitrile had been added, n-butyl bromide, 69 gms., was introduced slowly keeping the temperature between −25 and −30° C. The yield of capronitrile, b. p. 160–165° C., was 38 grams.

Example 2

Thirty-two grams of naphthalene were dissolved in 250–300 cc. of dimethyl ether. The temperature of this solution was maintained at approximately −50° C. while sodium chips (14 gms.) were added. Acetonitrile (20.5 gms.) was then gradually dropped in at a rate sufficient to destroy the green color of the sodium naphthalene as it left the surface of the sodium. This step was carried out at −50° C. Benzyl chloride (64 gms.) was then added to the reaction mixture keeping the temperature below −30° C. The dimethyl ether was then boiled off and the residue dissolved in benzene and washed with water to remove inorganic constituents. Tribenzyl acetonitrile formed in the reaction did not dissolve in either the benzene or water and was filtered off and recrystallized from butanol. It melted at 220° to 221°. After distilling benzene from the non-aqueous phase the product was then vacuum fractionated and dibenzylacetonitrile obtained. On recrystallization from alcohol it melted at 91° C. A yield of 43.5 gms. of crude dibenzylacetonitrile and 6 gms. of crude tribenzylacetonitrile were obtained.

We claim:

1. A process comprising reacting an alkali metal addition compound of a polycyclic aromatic hydrocarbon with an aliphatic nitrile having a replaceable hydrogen atom, said alkali metal addition compound being dissolved in an activating solvent for the reaction.

2. The process comprising reacting the sodium addition compound of naphthalene with acetonitrile, said sodium addition compound being dissolved in an activating solvent for the reaction.

3. The process comprising reacting an alkali metal addition compound of a polycyclic aromatic hydrocarbon with an aliphatic nitrile having a replaceable hydrogen atom, said alkali metal addition compound being dissolved in an activating solvent for the reaction and thereafter reacting the resulting alkali metal substitution compound of said nitrile with an organic halide.

4. The process comprising reacting an alkali metal addition compound of a polycyclic aromatic hydrocarbon with an aliphatic nitrile having a replaceable hydrogen atom, said alkali metal addition compound being dissolved in an activating solvent for the reaction and thereafter reacting the resulting alkali metal substitution compound of said nitrile with carbon dioxide.

5. The process comprising reacting an alkali metal addition compound of a polycyclic aromatic hydrocarbon with an aliphatic nitrile having a replaceable hydrogen atom, said alkali metal addition compound being dissolved in an activating solvent for the reaction and thereafter reacting the resulting alkali metal substitution compound of said nitrile with an alkyl halide.

6. The process comprising reacting the sodium addition compound of a polycyclic aromatic hydrocarbon with acetonitrile, said alkali metal addition compound being dissolved in an activating solvent for the reaction and thereafter reacting the resulting sodium substitution compound of acetonitrile with an alkyl bromide.

7. The process comprising reacting the sodium addition compound of a polycyclic aromatic hydrocarbon with acetonitrile, said alkali metal addition compound being dissolved in an activating solvent for the reaction and thereafter reacting the resulting sodium substitution compound of acetonitrile with ethyl bromide.

8. The process comprising reacting the sodium addition compound of a polycyclic aromatic hydrocarbon with an aliphatic nitrile having a replaceable hydrogen atom, said sodium addition compound being dissolved in an activating solvent for the reaction and thereafter reacting the resulting sodium substitution compound of said nitrile with carbon dioxide.

9. The process comprising reacting the sodium addition compound of naphthalene with acetonitrile, said sodium addition compound being dissolved in an activating solvent for the reaction and thereafter reacting the resulting sodium substitution compound of acetonitrile with carbon dioxide.

10. The process comprising reacting an alkali metal addition compound of a polycyclic aromatic hydrocarbon with an aliphatic nitrile having a replaceable hydrogen atom, said alkali metal addition compound being dissolved in an activating solvent for the reaction and thereafter reacting the resulting alkali metal substitution compound of said nitrile with a reagent reacting therewith to form a derivative of said nitrile having a CN radical and a molecular weight greater than said nitrile.

11. The process comprising reacting the sodium addition compound of naphthalene with an aliphatic nitrile having a replaceable hydrogen atom, said sodium addition compound being dissolved in an activating solvent for the reaction and thereafter reacting the resulting alkali metal substitution compound of said nitrile with a reagent reacting therewith to form a derivative of said nitrile having a CN value and a molecular weight greater than that of said nitrile.

NORMAN D. SCOTT.
JOSEPH FREDERIC WALKER.